Figure 1:
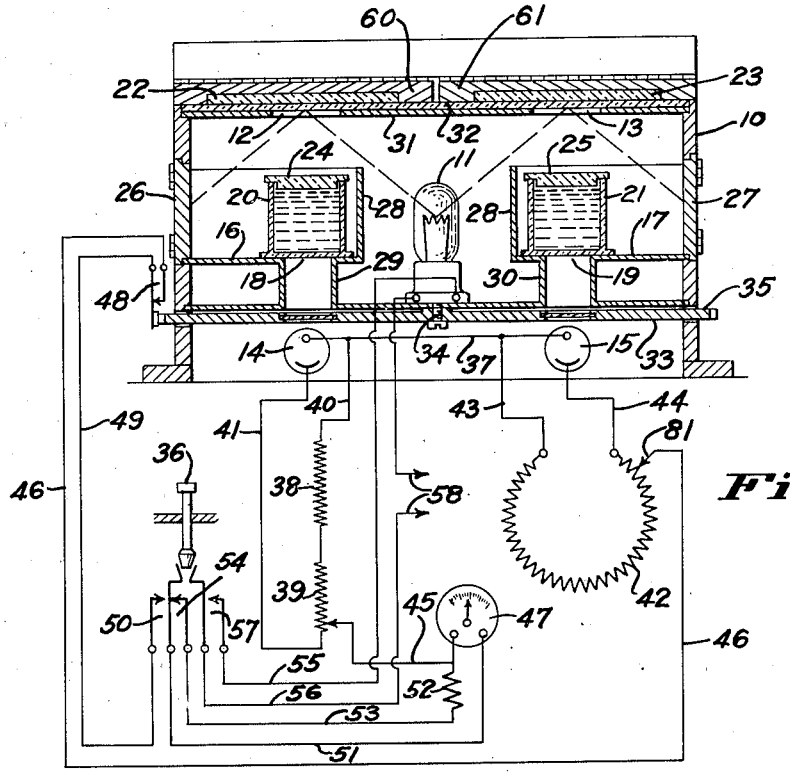

Feb. 17, 1942.   A. L. HOLVEN ET AL   2,273,356
PHOTOELECTRIC COLOR MEASURING AND ANALYZING APPARATUS
Filed March 11, 1939   2 Sheets-Sheet 1

INVENTORS
ALFRED L. HOLVEN
THOMAS R. GILLETT
BY
ATTORNEY

Feb. 17, 1942.  A. L. HOLVEN ET AL.  2,273,356
PHOTOELECTRIC COLOR MEASURING AND ANALYZING APPARATUS
Filed March 11, 1939  2 Sheets-Sheet 2
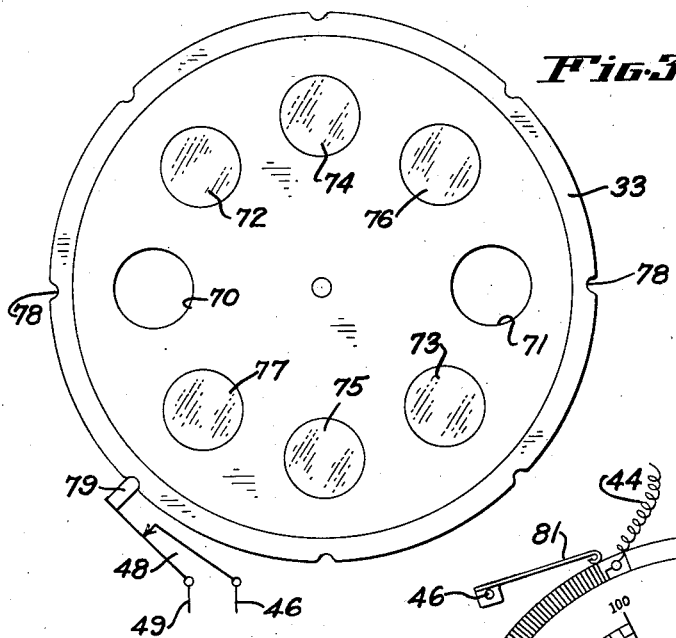
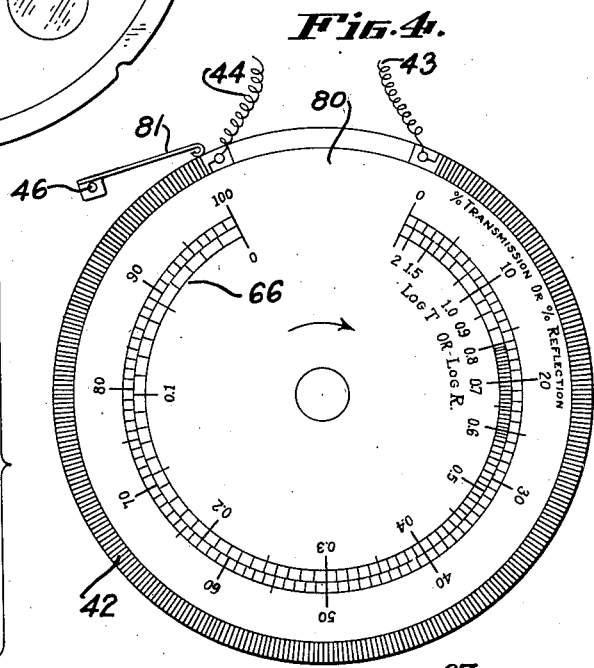
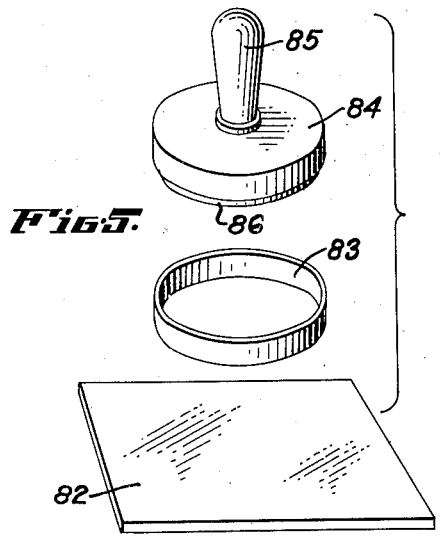
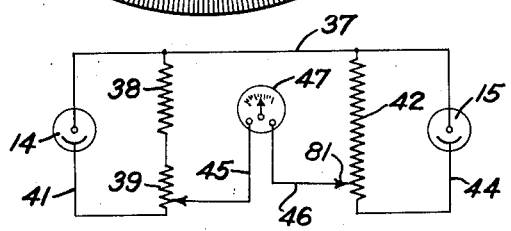
INVENTORS
ALFRED L. HOLVEN
THOMAS R. GILLETT
BY
ATTORNEY Patented Feb. 17, 1942

2,273,356

UNITED STATES PATENT OFFICE 2,273,356

PHOTOELECTRIC COLOR MEASURING AND ANALYZING APPARATUS

Alfred L. Holven and Thomas R. Gillett, Crockett, Calif.

Application March 11, 1939, Serial No. 261,268

8 Claims. (Cl. 88—14)

This invention relates to an improved apparatus for measuring and analyzing both the transmitted color and also the reflected color of liquid and solid materials and is a continuation in part of our co-pending application, Serial No. 758,342, filed December 19, 1934, entitled Photoelectric color measuring and analyzing apparatus, issued April 4, 1939, as Patent No. 2,152,645.

In our above identified application, a new apparatus was disclosed for measuring and analyzing the transmitted color of liquids and of transparent solids. This device was based on the use of photoelectric cells connected in a novel electrical circuit and combined with a source of illumination to provide a new instrument capable of accurately and directly reading the color of transparent samples.

In continuation, the novel features of the preceding application have now been developed further to furnish an apparatus which will measure not only transmitted color but reflected color as well. This adaptation, which will be disclosed in the present application, permits the measurement of reflected color to a degree of accuracy and in a manner of simplicity that was not possible heretofore. Furthermore, it is now possible to measure either reflected color or transmitted color, or both, in a single instrument without recourse to special adjustments, calibrations or other such changes required in similar prior art types of instruments.

The advantages of photoelectric means of measuring transmitted or reflected light over devices based on visual methods which are subject to the personal error of the observer are obvious to those skilled in the art. While photoelectric methods have been employed in the past, most of these are subject to errors attributable to variations in the response of the different photosensitive means employed. In the case of photoelectric cells these variations are in the main due to fluctuations in the potentials developed within the circuit. A further and more serious defect found in the prior art devices is that the readings obtained thereby do not have a strictly fundamental and linear relationship between the true color being measured and the actual readings of the instrument.

The present invention eliminates the principal errors associated with previous instruments by opposing, in a compensating electrical circuit whose degree of unbalance objectively furnishes a direct measure of the color in absolute units, the direct and unamplified output of two light-sensitive devices which are initially adjusted to a perfect equality of response.

It is the object of the present invention to achieve by photo-sensitive means, a measure of the color of transparent, translucent, or opaque materials without recourse to the usual mechanical arrangements such as calibrated adjustable shutters or movable illuminators, or electrical arrangements involving the use of amplifiers, batteries, indicating instruments and the like, any of which may influence the accuracy of the measurement.

Another object of this invention is to combine the photo-sensitive devices in a circuit of such type that the desired measurement will be indicated directly in terms of the unit or quantity to be measured, as for example, the appropriate units for expressing light transmittancy, density, or absorbing or reflecting qualities of a substance, without the necessity of either calculating to obtain the desired information or empirically calibrating the instrument.

It is a further object of the invention to furnish a measurement whose accuracy is unaffected by fluctuations in the intensity of illumination.

It is still another object of this invention to incorporate in a single instrument means for measuring both transmitted color and reflected color.

Other objects and advantages of the invention will be in part evident to those skilled in the art and in part pointed out hereinafter as the description thereof proceeds.

In general the invention embodies a new and novel combination of means for achieving the objects enumerated above. In the form shown the invention contemplates the use of two light sensitive cells of the current generative type, means for compensating for unequal sensitivities in the current generative cells, and a novel balanced circuit which is particularly adapted to cells of the current generative type and which differs from the circuits customarily employed with cells of the photo-emissive or photo-conductive types. The advantages of the circuit and the particular combination of elements employed will be evident from that part of the specification which follows.

Certain novel features which we believe to be particularly characteristic of our invention are a circuit in which no variable factors are involved in the photo-sensitive circuits proper, and in which the measurable magnitude of a resistance is directly proportional to the light transmissive or light reflective properties of the sample under measurement; means for precisely compensating for unequalities in the response of the cells employed; means for avoiding errors introduced due to the fatigue characteristics of the light sensitive devices of the current generative type; and the combination of light transmission and reflection measuring means in a single instrument.

For a better understanding of the invention reference should be had to the following description taken in connection with the accompanying drawings, wherein there is shown by way of illustration and not of limitation one embodiment thereof.

Figure 2:
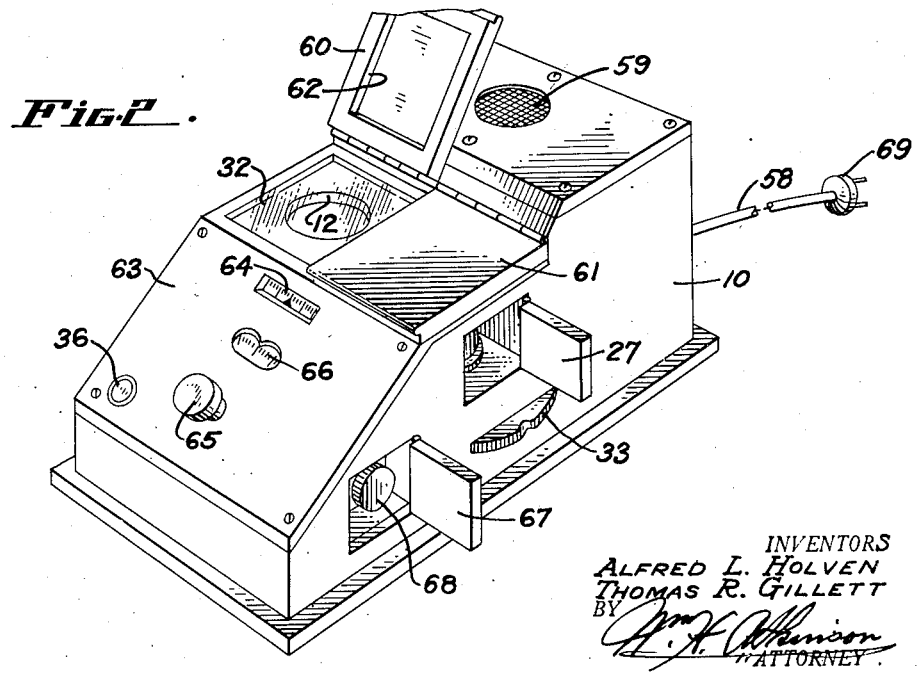

In the drawings, wherein like numerals refer to like parts throughout the several views;

Figure 1 is a schematic wiring diagram showing the arrangement and circuits contemplated by the invention, Figure 2 is a perspective view of a complete unit constructed in accordance with the invention, Figure 3 is a detailed view showing the construction of the color filter means adapted for use with the invention, Figure 4 is a detailed view of the preferred form of indicating dial and its associated slidewire resistance, Figure 5 is an exploded view showing a preferred means for obtaining uniform samples of a granular substance for measurement, and Figure 6 is a simplified schematic diagram of the circuit contemplated by the invention.

In accordance with our present invention, as was the case in our above identified copending application, we employ a circuit which involves distinct novelty. This circuit includes two light sensitive cells of the current generative type each of which is shunted by a fixed resistance that forms a permanently closed circuit in which neither variable resistances nor sliding contacts are used. Furthermore, by potentiometrically opposing the potentials developed across the shunting resistances in these closed cell circuits, a direct measure of light transmission through a liquid or light reflection by a solid is obtained by the movement of a single contact in the galvanometer circuit. In the above respects it will be obvious that this circuit differs considerably from circuits of the type employed in color measuring apparatus using amplifiers which may induce errors through changes in the straight line response of the cells, or circuits in which batteries are used that require adjustments of potential to gain a proper balancing of the circuit. In addition, the circuit employed in the present invention involves no external variables and requires no initial calibration.

In the measurement of the color of liquids, the concentration of coloring matter may be expressed on the basis of fundamental physical laws. That is, the percent of light absorption of a solution is a definite measure of the color of that solution. Similarly a fundamental relationship holds for the measurement of the color of solids. In the latter case, however, this is dependent upon the reflective power or conversely, the light absorptive power of the material under test. Therefore, the absolute absorption of a solid, which is the ratio between the absorption of a perfectly white surface and the light absorption of a test specimen may be considered, as in the case of a solution, as the color of that solid.

Upon referring to the drawings, it will be seen that the apparatus contemplated by the present invention is similar in many respects to that shown by our prior application. The circuit employed is basically the same, except for certain slight modifications. The arrangement, however, is considerably different in that it provides for the measurement of both reflected and transmitted light and is more compact due to the use of a simplified source of illumination. Furthermore, the photoelectric cells are so located with respect to the white reflecting surfaces employed in this improved apparatus that only the light diffusely reflected therefrom reaches the photocells. This is the case both for the measurement of transmitted light and the measurement of reflected light and is one of the novel features of the instrument. As will develop in the disclosure which follows, measurement of the diffused or indirect reflection instead of the direct reflection of light eliminates the effect of glare and other surface irregularities which normally introduce considerable error. As a result, the measurements obtained with this invention are much more accurate than with other types of color measuring devices.

Briefly and as diagrammatically illustrated in Figure 1 of the drawings, the present invention contemplates a suitable cabinet, designated by the numeral 10, having a source of illumination 11 which may comprise a single lamp or a plurality of lamps, as desired. This source of illumination 11 is so positioned within the cabinet 10 that it will direct light through two spaced apertures 12 and 13 located in the top of the cabinet 10. Arranged below and in line with the apertures 12 and 13 there are located respectively photocells 14 and 15. In addition to the above elements, the cabinet 10 is also provided with two intermediate shelves 16 and 17 having suitable apertures 18 and 19 therein over which solution containing vessels 20 and 21 may be placed when the apparatus is to be used in measuring the color of a solution. With this arrangement it will be understood that when the color or light absorbing characteristics of a solid surface is to be measured, the vessels 20 and 21 will be removed from the cabinet 10 and a standard of comparison, designated by the numeral 23, with which the color comparison is to be made, will be placed over the aperture 13 and at the same time a sample, designated by the numeral 22, the color of which is to be determined, will be placed over the aperture 12 so that when the source of illumination 11 is energized a light beam will be diffusedly reflected from the specimen 22 and the standard 23 respectively upon the photocells 14 and 15. When the apparatus is to be used for the measurement of the light absorption or percentage light transmission of a solution, the sample specimen 22 and the standard of comparison 23 located over the apertures 12 and 13 will be replaced by two similar white light reflecting elements and the vessels 20 and 21 containing respectively a sample specimen and a standard solution for comparison will be placed upon the shelves 16 and 17 so that when the source of illumination 11 is energized light beams of equal intensity will be diffusedly reflected through the solutions in the vessels 20 and 21 and directed upon the photocells 14 and 15 as is the case when the light absorbing characteristics of a solid surface are being measured. The vessels 20 and 21 are preferably cylindrical in construction and of optical glass and are provided with covers 24 and 25 of the same material. The covers 24 and 25 are also shown as having flat protuberances which extend into the vessels and thus provide a definite uniform thickness of the solution when the vessels 20 and 21 are properly filled.

Adjacent the shelves 16 and 17 the cabinet 10 is provided with light-proof doors 26 and 27 which when opened will permit the insertion of the vessels 20 and 21. Surrounding the perimeter of the shelves 16 and 17 and extending inwardly from the sides of the doors 26 and 27 there is a suitable baffle 28 and extending downwardly from the shelves 16 and 17 toward the photocells 14 and 15 there are cylindrically shaped protectors 29 and 30 that serve to prevent extraneous light from influencing the photocells 14 and 15. As an additional precaution the entire interior of the cabinet 10 including the shelves 16 and 17 and the associated parts thereof will be painted a flat black so that no other light than that diffusedly reflected from the apertures 12 and 13 will be directed upon or in any way influence the photocells 14 and 15. At this point it will be noted that the apertures 12 and 13 are formed in a top or cover plate 31 over which there is disposed a sheet of glass 32 upon which the sample 22 and a standard 23 may be placed when the reflectance of a solid is being measured or upon which two similar white reflecting elements may be placed when the color of a solution is being measured.

In order to provide for tri-chromatic analysis of any particular sample, either solid or solution, the cabinet 10 also carries a rotatable disc-like member 33 having suitable filters whose purpose is to simultaneously furnish each of the photocells 14 and 15 with light of identical color characteristics. These filters, as will hereinafter appear, may consist of any material which is transparent to only a selected spectral band. As shown, the disc-like member 33 is mounted upon a pivotal axis 34 located centrally within the cabinet 10 so that the edge of the member 33 extends outwardly through the side of the cabinet as at 35 where it may be engaged by the hand of an operator for the purpose of turning same and bringing the particular filter elements into alignment with the photocells 14 and 15.

Reference is now made to the balancing circuit associated with the photocells 14 and 15 by means of which the color values are measured and determined. This circuit is identical with the circuit disclosed in our copending application, except that it provides for an adjustment of the measuring circuit to compensate for any difference in the response of the photoelectric cells 14 and 15 when exposed to light beams of equal intensities. In our earlier patent, this adjustment is accomplished by optical means which controls the intensities of the light beams projected upon the cells. In this arrangement, like terminals of the photocells 14 and 15 are connected together by a common conductor 37 and each of these cells is connected in parallel with or shunted by resistances of a fixed value. The photocell 14 is shunted by two series connected resistance units 38 and 39 by means of conductors 40 and 41 and the photocell 15 is shunted by a fixed resistance 42 by means of conductors 43 and 44. At this point it should be stated that the total resistance of the resistance units 38 and 39 is approximately equal to the total resistance of the resistor 42. Connected between an adjustable point upon the resistor 39 by means of a conductor 45 and an adjustable point upon the resistor 42 by means of a conductor 46 there is a galvanometer 47 by means of which the condition of balance between the potentials developed in the shunting resistance circuits of the photocells 14 and 15 may be determined. This latter circuit may be traced from the conductor 46 through a normally closed switch 48, the purpose of which will hereinafter appear, to a conductor 49 and through a normally open switch 50, which is controlled by the push-button 36, to a conductor 51 which connects with one side of the galvanometer 47. The remainder of this circuit can be traced from the other side of the galvanometer 47 through the conductor 45 to the adjustable resistor 39. When the shunting resistance circuits of the photocells 14 and 15 are thus connected through the galvanometer 47 with their like terminals connected in common, as provided by the conductor 37, the potentials developed in the shunting resistance circuits of the photocells 14 and 15 will be in opposition to each other. Therefore, when the potentials developed by the photocells 14 and 15 are equal the galvanometer 47 will indicate no current flow therethrough. In practice we prefer to use a low resistance galvanometer of the lamp and scale variety. For the shunting resistance circuit of the photocell 15 we prefer to use a circular slidewire resistance 42 and for the shunting resistance circuit of the photocell 14 we prefer to use a precision wire wound resistance 38 and an adjustable resistance 39 of the circular rheostat type. In this circuit the galvanometer 47 is adapted to be shunted by a resistance 52 which is connected across its terminals by means of a conductor 53, the contacts of a switch 54, controlled by the push-button 36, and the conductor 51. This shunting resistance 52 is to protect the galvanometer against shock when the apparatus is not in use. A further difference in this circuit over that disclosed in our prior copending application is that the push-button 36 is adapted when depressed to also close the circuit of the illuminating lamp 11. This is accomplished through conductors 55 and 56 which connect with the terminals of a switch 57 that is adapted to be closed when the push-button 36 is depressed. The conductor 56 also includes a source of current supply 58 for the lamp 11.

As is more clearly shown in Figure 2 of the drawings, the cabinet 10 is provided with a vent 59 for the escape of the heat generated by the lamp 11 and disposed in hinged relation over the glass 32 at the top thereof it carries two cover-like members 60 and 61 under which the reflection producing standards are adapted to be placed when the apparatus is in use to measure the color of a solution. The cover-like members 60 and 61 are each shown as having a recess 62 into which the reflection producing standards in the form of tiles are positioned when these members are in their closed position. This will bring the surface of the reflection producing standards centrally over the apertures 12 and 13 of the cabinet 10. It will also be noted that the cabinet 10 has an inclined panel 63 at its front end through which the galvanometer scale, designated by the numeral 64, is visible. This panel 63 also carries the push-button 36 and a control knob 65 by means of which a dial 66 that is associated with the resistance 42, as will hereinafter appear, is rotated. At the side of the cabinet 10 and accessible through a hinged door 67 there is a knob 68 by means of which the conductor 45 may be adjusted in its connection with the variable resistance 39 in the circuit of the photocell 14. The conductors 58 which supply energy for the lamp 11 are shown in this figure of the drawings as a lead having a connector 69 at the end thereof by means of which connection may be made with a suitable power outlet.

Upon referring to Figure 3 of the drawings it will be noted that the disc-like member 33 is provided with four pairs of diametrically opposed apertures through which the diffusedly reflected light may pass to the photocells 14 and 15 when the apparatus is in operation. Two of these apertures, designated by the numerals 70 and 71, are shown as open and without a filter element therein so that an unfiltered light beam may be projected upon the cells 14 and 15 should no filtering be desired. In addition to these open apertures, the disc-like member 33 also carries two oppositely disposed filters 72 and 73 of like transmitting characteristics, two oppositely disposed filter elements 74 and 75 of similar light transmitting characteristics but which differ from the filters 72 and 73 and also two filter elements 76 and 77 which are also similar but which have light transmitting characteristics differing from the previously referred to filter elements. As is more clearly illustrated in this figure of the drawings, the disc-like member 33 is also provided with notches 78 into which a switch controlling follower 79 carried by the switch 48 is adapted to engage when the apertures 70 and 71 or any of the pairs of filter elements are in proper alignment with the photocells 14 and 15. With this arrangement it will be seen that the circuit of the galvanometer 47 will be held open whenever the monochromatic spectral band filters or the open apertures 70 and 71 are not in perfect alignment with respect to the light-sensitive cells 14 and 15.

In addition to the color filters carried by the disc-like member 33 we may also, to furnish a more complete color analysis of a sample, provide a greater number of filters of narrow spectral bands. We have found it possible to prepare substantially monochromatic color filters by superimposing two gelatin film filters, one of said filters being absorptive of all wave lengths above the upper limit of the desired spectral transmission band, while the other of said filters absorbs all wave lengths below the lower limit of the desired spectral transmission band. By such means it has been possible to assemble a series of monochromatic color filters covering in frequent intervals the entire visible spectrum.

Reference is now made to Figure 4 of the drawings for a detailed description of the manner in which the fixed resistance 42 in the shunt circuit of the photocell 15 is associated with the properly calibrated indicating dial 66. As here shown, the resistance 42 is mounted upon the periphery of a disc-like support 80 which is adapted to be turned by the control knob 65 previously identified as mounted upon the front panel 63 of the cabinet 10. The disc-like member 80 has two graduated scales, the outer one of which is in the terms of percent transmission or percent reflection, while the inner scale is graduated in terms of —log. T or —log. R, as will more clearly appear hereinafter. As here shown, the conductors 43 and 44 which connect the resistance 42 in shunt with the photocell 15 are coiled and/or otherwise arranged so that the entire resistance 42 may be rotated with respect to a stationary contact 81 to which the conductor 46 of the galvanometer circuit is connected. At this point it may be stated that the photoelectric circuit herein disclosed lends itself particularly well to both the measurement of transmitted color and of reflected color, as the percentage of the total slidewire resistance required in the galvanometer circuit is mathematically equivalent to the percentage light transmission or light reflection of the sample being measured. For similar reasons, the transmitted color in absolute absorption units or the reflected color in absolute reflectance units is equal to the minus logarithm of the percentage of the total slidewire resistance required to balance the galvanometer. Therefore, with a circuit of this type, it is possible to engrave both the percentage scale from 0 to 100 and the minus logarithm scale on the indicating dial without making a preliminary calibration of the instrument. Thus in the measurement of transmitted color, the outer scale gives the percent transmission of the sample and the inner scale gives the —log. T or absolute absorption of the sample. Likewise, in the measurement of reflected color the same outer scale gives the percent reflection of the sample and the same inner scale gives the —log. R or absolute reflectance of the sample. Thus in a single instrument with a single scale it is possible to read either light transmission or light reflection directly. This dial may also be equipped with secondary scales such as the Stammer scale, N. P. A. scale, or Hess-Ives scale. The value of this novel feature of direct reading scales is obvious as it eliminates the necessity for extra calculations or the use of special tables or graphs such as are required with most types of such devices in order to obtain both transmitted and reflected color values. From the above it will be apparent that when the apparatus is being used to compare the color of a standard and sample solution each of the covers 60 and 61 will be closed and have thereunder a diffused light reflecting tile or other means which will provide a white reflecting surface, whereas when the apparatus is to be used to compare the color values of the light reflecting surface of a solid, one of these covers will be closed upon a standard tile or other light reflecting standard and the other cover will be raised so as to permit the placing of a solid sample over its corresponding aperture.

In Figure 5 of the drawings, there is shown a simple means for preparing a test sample of granulated material, such as sugar for example. As shown, this apparatus comprises a sheet of glass 82, an open ring 83 and what may be termed a tamper 84 which has a suitable handle 85. The tamper 84 also has a reduced end portion 86 that is adapted to extend into the ring 83 a predetermined distance, as determined by the axial length of this extension. In practice the length of this extension 86 will be determined by the compactability of the particular granular material being prepared for test. In preparing a sample of granulated sugar with this apparatus the operator first places the ring 83 upon the glass 82 and then after filling the ring 83 and scraping off the excess with a straight edge passed over the top of the ring 83, he next places the tamper 84 over the ring and presses down upon the sample until the tamper 84 engages the upper edge of the ring 83. This serves to compact the granules of the sugar in a uniform manner and provides a wafer-like sample which can be transferred from the glass plate 82 to the glass 32 disposed over the apertures 12 and 13 of the cabinet 10.

Upon referring to Figure 6 of the drawings, it will be noted that the photocells 14 and 15 are each shunted by resistances that are included in permanently closed circuits in which neither variable contacts nor variable resistances are used. The two resistances 38 and 39 in the shunting circuit of the photocell 14 have a value corresponding to that of the resistance 42 in the shunting circuit of the photocell 15 and while the conductor 45 is shown as having an adjustable connection with the resistance 39 it is to be understood that this is only for the purpose of providing an initial adjustment of the apparatus and has no function when the apparatus is in use to obtain a color measurement. As will hereinafter appear, the initial adjustment of the conductor 45 upon the resistance 39 is made in this particular adaptation of our invention in lieu of the optical adjustment of illumination intensity employed in our prior copending application to compensate for any difference in the response of the two photocells 14 and 15. This adjustment of the conductor 45 along the resistance 39 offers a novel means for initially adjusting the relative potentials developed in the shunt circuits of the photocells 14 and 15 to such a ratio as may be required to bring about an equal response from both of these cells, irrespective of any difference which may have existed in their original sensitivities as measured by their relative response to equal illumination. With respect to this adjustment, it may be said that after the connector 45 has been properly set no further adjustments thereof are necessary. This change appeared desirable in the present invention because of the change in the nature of the source of illumination. However, it should be pointed out that this modification is slight and in no way affects the basic principles of the measuring circuit as the cell 14 is still shunted by a total resistance of fixed value. In other words, by opposing the potentials developed by the photocells 14 and 15 across their respective shunting resistances, as herein described, a direct measure of the percentage light transmission of a sample or the percentage light reflection of a sample may be obtained with relative movement of the single contact 81 upon the resistance 42.

In considering the basic principles of operation involved in this modified adaptation of our invention it will be assumed that the light-sensitive cells 14 and 15 are identical in response. If light of equal intensity reaches both cells, causing equal responses by the cells, the potential differences across the resistance 42 and the series connected resistances 38 and 39 will be exactly equal but opposite in direction and therefore no current will flow in the galvanometer circuit. This will be indicated by a zero reading of the galvanometer 47. If, however, both cells 14 and 15 are not the same in their response, the movable conductor 45 associated with resistance 39 may be adjusted sufficiently to compensate for such differences. Investigation has shown that with the stronger illumination necessarily employed for measuring both reflection and transmission in the manner shown, the optical means used in our prior patent for initially compensating for differences in cell response does not lend itself as well to this purpose. In actual practice however, when constructing the instrument, the source of illumination is adjusted originally to provide approximate equality of response. The movable contact of the conductor 45 is therefore merely employed to provide a final or vernier adjustment. This modification in the means of compensating for differences in cell response is thus slight and in effect the two cells 14 and 15 are still shunted by fixed resistances which are not changed once the circuit is initially balanced.

Now assume that the diffusedly reflected light reaching cell 14 has been decreased, either by inserting a colored solution in front of cell 14 as in the measurement of light transmission, or by substituting a colored sample for the white reflecting surface over the aperture 12, in the event of measuring light reflectance. Under these conditions the current generated by cell 14 will be correspondingly decreased and result in a smaller potential difference across the shunting resistance 38 and that portion of shunting resistance 39 which is in the galvanometer circuit. This causes a current to flow in the galvanometer circuit as will be indicated by deflection of the pointer of the galvanometer 47. This unbalanced condition will continue to exist until the movable contact 81 is adjusted to such a point on slidewire resistance 42 that the potential drop across the active portion of resistance 42 still in the galvanometer circuit is exactly equal to the potential drop across resistance 38 and that portion of resistance 39 in the galvanometer circuit, all as will be indicated by a zero reading on the galvanometer 47. Thus the percentage of the slidewire resistance 42 which must be left in the circuit to rebalance the galvanometer 47 is a direct measure of the light reaching cell 14 and is therefore similarly a measure of the color of the sample.

If the slidewire resistance 42 is calibrated in equal units such as 0 to 100, the dial reading will indicate directly the percentage of light transmitted through a sample in the vessel 20, or the light reflected by the sample located over the aperture 12, as the case may be. Furthermore, similarly to the fact that it is a physical law that the color in transmission units is mathematically equal to the minus logarithm of the transmission, it is also true that the color in reflectance units is mathematically equal to the minus logarithm of the reflectance. The slidewire dial may therefore be etched with a second scale which will furnish a direct reading of either transmitted color in absolute transmission units or reflected color in absolute reflectance units.

The discussion which immediately follows shows how the above described principles are employed in the practical application of this invention. This discussion will necessarily be considered from two standpoints, namely, the measurement of transmitted color and the measurement of reflected color. Considering the measurement of transmitted color first, it is first necessary to balance the outputs of the cells against each other so that they will both give equal responses, that is, to compensate for the differences in the photoelectric response of the two cells. This initial balance should be carried out with both absorption vessels 20 and 21 located in place in the respective light paths, and with both vessels containing the same material, usually water or a similar colorless liquid. Also it should be made certain that the white reflecting surfaces placed over the apertures 12 and 13 at the top of the cabinet 10 are properly placed in their respective locations. In addition, it is necessary that light of identical wavelength should reach both cells. The push-button 36 is then depressed, and the knob 68, which moves the conductor 45 along the resistance 39, is rotated until the galvanometer 47 balances at zero. During this adjustment, the slidewire dial 66 should be set at 100, the position in which the full amount of the resistance 42 is in the galvanometer circuit. Once the apparatus has been initially balanced in this manner, the color of any number of samples may be determined without further adjustment of the instrument. However, it is desirable, as a precautionary measure, to check the balance before each group of determinations.

In vessel 20 is then placed the sample whose color it is desired to measure. When the galvanometer circuit controlling switch 50 and the illumination circuit contacts controlling switch 57 are closed by a depression of the push-button 36, the galvanometer 47 will deflect, due to the fact that the sample in front of cell 14 has reduced the amount of light reaching this cell, therefore, its response is less than that of cell 15 as heretofore described. Then by rotating the slidewire 42 by means of knob 65 until galvanometer 47 shows zero deflection, the transmitted color value of the sample can then be read directly from the calibrated dial 66 as observed through the opening in panel 63 of the cabinet 10.

In analyzing the composition of the color of any particular sample, readings are obtained in a manner similar to that described above but at various wavelengths of the visible spectrum by consecutively disposing each of a series of monochromatic color filters of different wavelengths in the paths of the light beams. In actual operations, this is accomplished by adjusting the disc-like member 33 in a position corresponding to some particular wave length, depressing the push-button switch 36, and rotating the slidewire controlling knob 65 until the galvanometer 47 is balanced. The reading is then taken from the dial 66, the disc-like member 33 can then be rotated to its next filter position, and the procedure repeated. In this way, transmission or absorption values may be obtained at any or all desired wave lengths in the visible spectrum thus giving values for plotting color composition curves.

For our particular purpose, we have found that either color measurement at a single wave length, provided by a filter which modifies the response of the cells employed to a sensitivity similar to that of the human eye; or a trichromatic analysis of a product with the use of three filters individually covering the red, green, and blue portions of the spectrum; or a complete color analysis in which eight or more monochromatic color filters may be employed at regular wave length intervals in the visible spectrum, gives the desired information regarding the color of any given sample. However, any type of filter may be employed, for example, by the use of infra-red or ultra-violet filters, measurements may also be extended into such portions of the spectrum.

In the manner described above a measurement of the light transmitting or absorbing properties of a material may be obtained with an extreme degree of accuracy.

Now consider the operation of the apparatus when employed for the purpose of measuring the reflected color of a sample. As in the former case, it is first necessary to initially balance the outputs of the cells 14 and 15 against each other to compensate for any difference in their response. In this balancing operation, it is made certain that the white reflecting standards or tiles are properly located over their respective apertures 12 and 13, and also that the absorption vessels 20 and 21 are removed from their respective supporting shelves 16 and 17. In addition, it is necessary that light of identical wavelength reach both cells. The push-button 36 is then depressed and the knob 68, which moves the connection of the conductor 45 along resistance 39, is rotated until the galvanometer 47 balances at zero. During this adjustment, the slidewire dial 66 should be set at 100, this being the position in which the full amount of the resistance 42 is in the galvanometer circuit.

At this point it might be well to further discuss the use and character of the reflecting standards or tiles placed over the apertures 12 and 13. In actual practice it is practically impossible to obtain a surface having 100% reflection. Magnesium carbonate, which is listed at 98% reflectance in International critical tables (vol. 5, p. 262) is the closest practical approach to absolute white, and although employed as a standard in some instruments it is not suitable for routine color comparisons, due to its fragile nature. However, by initially determining the reflectance of some more resistant material as compared to magnesium carbonate and using this predetermined relationship, a practical means of measuring color in absolute absorption units is obtained. A standard tile suitable for this purpose is a white tile known in the trade as "Hermosa" type, manufactured by the Gladding-McBean Co. This tile has been found to have an absolute reflectance of approximately 87%. When this type of white tile is used and the instrument is initially balanced at 100, the slidewire reading thus obtained in measuring the color of any sample will not represent absolute reflection but only relative reflection as compared with a surface having 100% reflection. However, to obtain a direct measure in absolute reflectance units, it is only necessary to balance the slidewire 42 initially at the absolute reflectance value of the white tile used. Therefore, it is possible to employ any standard having a known reflectance value. This reading of absolute reflectance or transmission may then be converted into terms of absolute absorption by subtracting from 100, or a direct reading scale may be provided on the dial 66. These tiles are carefully selected and must be equal in reflecting properties. As indicated in Figure 2, these tiles are adapted to be placed in the recesses 62 of the members 60 and 61, said members, for convenience, being hinged to the cabinet 10 in order to always maintain the reflecting tiles in a fixed relation with respect to the other elements involved.

Once the apparatus has been initially balanced as previously described, the reflected color of any number of samples may be determined without further adjustment of the instrument, unless it is desired to check the balance point as a precautionary measure before each group of determinations are made.

After the instrument is initially balanced, the hinged member 60 containing the reflecting standard is raised and the sample to be tested is located directly in its place on the glass plate 32 over the aperture 12. The push-button 36 is then again depressed and the galvanometer 47 will deflect due to the fact that the sample diffusely reflects less light to the cell 14 than the comparison standard under the hinged member 61 reflects to cell 15, and therefore the response of the cell 14 will be less than that of the cell 15. By rotating the slidewire resistance 42 by means of knob 65 until the galvanometer 47 shows zero deflection, the reflected color value of the sample can then be read directly from the calibrated dial 66 as observed through the opening in panel 63 of the cabinet 10.

The apparatus herein described has been employed, in the particular work of the applicants, for the purpose of measuring the color of soft sugars, also known as brown sugars. The sample of soft sugar is prepared by gently pressing the sugar into place in the metal ring 83 located on the glass plate 82 and is then firmly compressed to a predetermined depth by means of the wooden or Bakelite tamper 84. The sample is then transferred to a position over the aperture 12 with its smooth surface facing the cell where its color is determined as outlined above.

It is to be understood that this instrument is also applicable to the measurement of the color or reflecting properties of any solid material such as cloth, wood, paper, tile, paint and the like, all of which should be considered within the scope of this invention.

For our particular purpose, where the various samples approximate the same hue in color, we have found it convenient to dispense with the use of a color filter. However, the color disc 33 is so equipped with spectral color filters to allow color measurements through a filter having the spectral characteristics of the human eye or to allow trichromatic color analysis. With slight modification the apparatus, as has been stated above, may have a series of monochromatic color filters of different spectral wavebands to provide for an entire color analysis of the sample.

By the term light-sensitive devices or cells of the current-generative type, or photo-generative cells, as used in the foregoing description, we refer particularly to any photo-sensitive device which will generate a current substantially proportional to the amount of radiant energy which it receives and without the application of electrical energy from an outside source. The most common of such light-sensitive cells of the current-generative type consists of a light permeable layer of copper oxide formed on copper. A more or less typical example of such a device is the "Weston Photronic cell."

The characteristics employed in the application of any such photo-generative cells are very different than those encountered in the application of either the photo-emissive cell (such as the potassium hydride photo-electric cell) or the photo-conductive cell (such as the selenium cell). In cells of either the photo-emissive or the photo-conductive type, an outside source of potential must be applied, and, in both of such cells, it is the property of conductance which is substantially proportional to the radiant energy received, and a compensating arrangement of such cells may therefore be achieved by a simple Wheatstone bridge circuit. In the photo-generative cells, however, it is the generated current rather than conductance which is proportional to the radiant energy, and a circuit similar to that disclosed by the present specifications rather than a Wheatstone bridge is necessary to achieve a perfectly balanced compensation in an arrangement employing two photo-generative cells.

From the foregoing description, it is readily apparent that our invention will provide a means for simply, accurately, and rapidly measuring or analyzing the color of any light reflecting or light transmitting agent. Among the numerous advantages of the apparatus described, it should be noted that the instrument operates independently of variations in intensity of the light source and provides for a direct measure or analysis of color without factorial or empirical correction. Furthermore, in a single instrument means have been provided for measuring either the transmitted color of a material or the reflected color of a material. It will also be noted that the photo-electrical color measuring device disclosed herein uses none of the standardized electrical indicating instruments often employed in color measuring devices based on photoelectric principles. By dispensing with such indicating instruments, a prevalent source of error in photoelectric photometry has been eliminated.

We wish to point out in particular that by combination of the various elements described and by suitable arrangement of said elements with respect to each other, we have produced a new and novel apparatus capable of photoelectrically measuring the color or composition of color of a given sample. The method of operating this apparatus is of such simplicity that no previous knowledge or experience is required and untrained persons, after brief instructions, can accurately make color determinations or color analyses with this instrument.

While our invention has been particularly described as capable of measuring the transmitted color of liquids or the reflected color of solids, it is susceptible of embodiment in numerous variations and adaptations. For example, the light transmission of translucent and transparent solids at various wave lengths may be measured. Likewise, the color of certain gases may be determined. Also, with slight modifications, a measurement of the turbidity of liquids may be obtained. Furthermore, while this invention has only been described in connection with the measurement of the color of one thickness of liquid, it is readily possible to measure greater or lesser thicknesses and thus extend the range of the device to extremely light-colored and dark-colored liquids.

Other applications of this invention will be readily apparent to those skilled in the art.

The foregoing description does not by any means cover all of the possible uses of our invention nor the forms which it may assume, but serves to illustrate its fundamental principles and an assembly in which the novel features as disclosed above have been incorporated. It is obvious that changes in the details may be made without departing from either its novel characteristics or the spirit and scope of our invention as defined in the appended claims.

Having thus described our invention, what we claim and desire to secure by Letters Patent is:

1. In a photoelectric measuring circuit, the combination of a source of illumination adapted to illuminate a sample specimen and a standard of comparison, two photoelectric cells of the current generative type arranged and adapted to respectively respond to light from said source of illumination as influenced by said sample specimen and said standard of comparison, a resistance connected in shunt with the terminals of each of said photoelectric cells, the resistances in said cell shunting circuits being of a fixed and equal value, a connection between like terminals of said cells and a corresponding end of each of said resistances, whereby the potentials developed in said resistances by said cells will be in opposition to each other, a circuit including a galvanometer connected between said resistances and adjustable at one end with respect to one of said resistances to compensate for any difference in the response of said cells under like light conditions and adjustable at its other end with respect to the other of said resistances to balance said galvanometer circuit under unlike light conditions, and means associated with the latter adjustable end of said galvanometer circuit adapted to indicate the light influencing characteristic of the sample specimen in terms of the standard of comparison when the galvanometer indicates an equality between the potentials developed by said cells in the measurable portions of said resistances.

2. In a photoelectric color measuring circuit, the combination of a first and a second light sensitive cell of the current generative type, said light sensitive cells having like terminals at one side thereof connected together, a shunting resistance of fixed value for each of said cells connected across the terminals thereof, said shunting resistances being of equal value, a single source of illumination common to said cells, a circuit connected between said cell shunting resistances adjustable at one end along the shunting resistance of said first cell to compensate for any difference in the response of said cells under like conditions of color and adjustable along the shunting resistance of said second cell to equalize the potentials developed in said circuit by said cells when exposed to different color conditions, a galvanometer in said latter circuit adapted to indicate a zero reading when the potentials across the measurable portions of said resistances are equal, and a calibrated scale associated with the latter adjustable end of said circuit adapted by the adjustment of the potential equalizing connection upon the shunting resistance of said second cell to indicate the color value of a specimen in terms of absolute color units.

3. In a photoelectric color measuring circuit, the combination of a first photo-generative cell responsive to the color of light controlled by a standard of comparison, a second photo-generative cell responsive to light controlled by a sample the color of which is to be determined, said photo-generative cells having like terminals thereof connected together, a fixed resistance shunting said first photo-generative cell, a second fixed resistance of equal magnitude shunting said second photo-generative cell, a circuit including a null-point galvanometer connected between said first fixed resistance and a point adjustable intermediate the ends of said second resistance, a graduated scale adjacent said second resistance to provide a direct indication of the color of a specimen in terms of a standard of comparison when the value of the included portion of said second resistance has been adjusted to produce a zero reading upon said galvanometer, and an adjustable connection between the other end of said circuit and said first resistance for initially adjusting the circuit to compensate for any difference in the response of said first and second cells under like conditions of color.

4. In a photoelectric color measuring device, the combination of a first and a second light sensitive cell of the current generative type, said light sensitive cells being of like character and having like terminals at one side thereof connected together, a shunting resistance connected across the terminals of each of said cells, said shunting resistances being of fixed and equal value, a single source of illumination, a galvanometer circuit connected between points intermediate the ends of said cell shunting resistances having a sliding contact movable along the shunting resistance of said second cell, a galvanometer in said latter circuit adapted to indicate when the potentials developed in said latter circuit by said cells are equal, a connection between the other end of said galvanometer circuit and the shunting resistance of said first cell adjustable to compensate for any difference in the response of said cells when all of the resistance of said second cell shunting resistance is in the galvanometer circuit and light of equal intensity is directed upon said cells, and a scale graduated from 0 to 100% arranged in a fixed position with respect to the shunting resistance of said second cell with which the sliding contact of said galvanometer circuit is adapted to cooperate to indicate in terms of per cent transmittance or per cent reflectance the light transmittance or light reflectance characteristics of the specimen.

5. In a photoelectric color measuring device, the combination of a first and a second light sensitive cell of the current generative type, said light sensitive cells being of like character and having like terminals at one side thereof connected together, a shunting resistance connected across the terminals of each of said cells, said shunting resistances being of fixed and equal value, a single source of illumination, a galvanometer circuit connected between points intermediate the ends of said cell shunting resistances having a sliding contact movable along the shunting resistance of said second cell, a galvanometer in said latter circuit adapted to indicate when the potentials developed by said cells are equal, a connection between the other end of said galvanometer circuit and the shunting resistance of said first cell adjustable to compensate for any difference in the response of said cells when all of the resistance of said second cell shunting resistance is in the galvanometer circuit and light of equal intensity is directed upon said cells, and a graduated scale arranged in a fixed position adjacent the shunting resistance of said second cell with which the sliding contact of said galvanometer circuit is adapted to cooperate to indicate in terms of transmittance or reflectance the light transmittance or light reflectance characteristics of the specimen, said scale being positioned with respect to said second cell shunting resistance to compensate for any difference in the light transmittance or reflectance of the standard of comparison from an absolute 100% transmittance or reflectance, whereby the position of said sliding contact upon said scale will indicate in absolute units the per cent transmittance or reflectance of the specimen.

6. In a photoelectric color determining apparatus, the combination of a first and a second light sensitive cell of the current generative type, said light sensitive cells being of like character and having like terminals at one side thereof connected together, a shunting resistance connected across the terminals of each of said cells, said shunting resistances being of a fixed and equal value, a single source of illumination, a galvanometer circuit adjustably connected between the shunting resistances of said cells, a zero reading galvanometer in said latter circuit, a connection at one end of said galvanometer circuit adjustable along the shunting resistance of said first cell to compensate for any differences in the response of said cells and thus balance said galvanometer at zero when light of equal intensity is directed upon said cells, an adjustable connection at the other end of said galvanometer circuit associated with the shunting resistance of said second cell adapted when properly adjusted to produce a zero reading of said galvanometer when a specimen under test is interposed between the source of illumination and said first cell, and a graduated scale associated with the shunting resistance of said second cell adapted by the position of said adjustable connection upon said latter shunting resistance to indicate in absolute units the color relation between the standard of comparison interposed between the light source and said second cell and a specimen interposed between said source of illumination and said first cell.

7. In a photoelectric light absorption measuring device, the combination of a photoelectric cell of the current generative type, a first resistance of fixed value forming a closed shunt circuit across the terminals of said cell, a second and similar photoelectric cell of the current generative type, a second resistance having a fixed value equal to that of said first resistance forming a closed shunt circuit across the terminals of said second cell, an electrical connection between the like poles at one side of said cells, a second electrical connection extending between the fixed resistance in shunt circuit across the terminals of said first photoelectric cell and a point variable along said second resistance in shunt with the other of said photoelectric cells, said latter circuit having a zero current indicating galvanometer connected therein, means for varying the connection of said latter circuit with said second resistance to effect a zero balance of said galvanometer, and a cooperating scale graduated in —log T values mounted adjacent and extending along said second resistance adapted by the position of said varying connection upon said second resistance to indicate the light transmittance characteristic of a specimen.

8. In a photoelectric measuring circuit, the combination of a source of illumination, a power circuit for said source of illumination, a measuring circuit including two photoelectric cells the outputs of which correspond to the light reaching same from said source of illumination, a galvanometer adapted to be connected in said measuring circuit and indicate when the potentials developed by said photoelectric cells are equal, a shunt in circuit with said galvanometer to protect same when not in use, and a switching means adapted to connect said galvanometer into the measuring circuit, open said galvanometer shunt circuit and close the circuit of said illuminating means by a single operation.

ALFRED L. HOLVEN.
THOMAS R. GILLETT.